Oct. 10, 1950     E. W. SPRINGER     2,524,847
HERALD TRAINER

Filed Nov. 20, 1944     4 Sheets-Sheet 1

Inventor
EARL W. SPRINGER
By P. E. Bush
Attorney

Oct. 10, 1950     E. W. SPRINGER     2,524,847
HERALD TRAINER

Filed Nov. 20, 1944     4 Sheets-Sheet 2

Inventor
EARL W. SPRINGER

Attorney

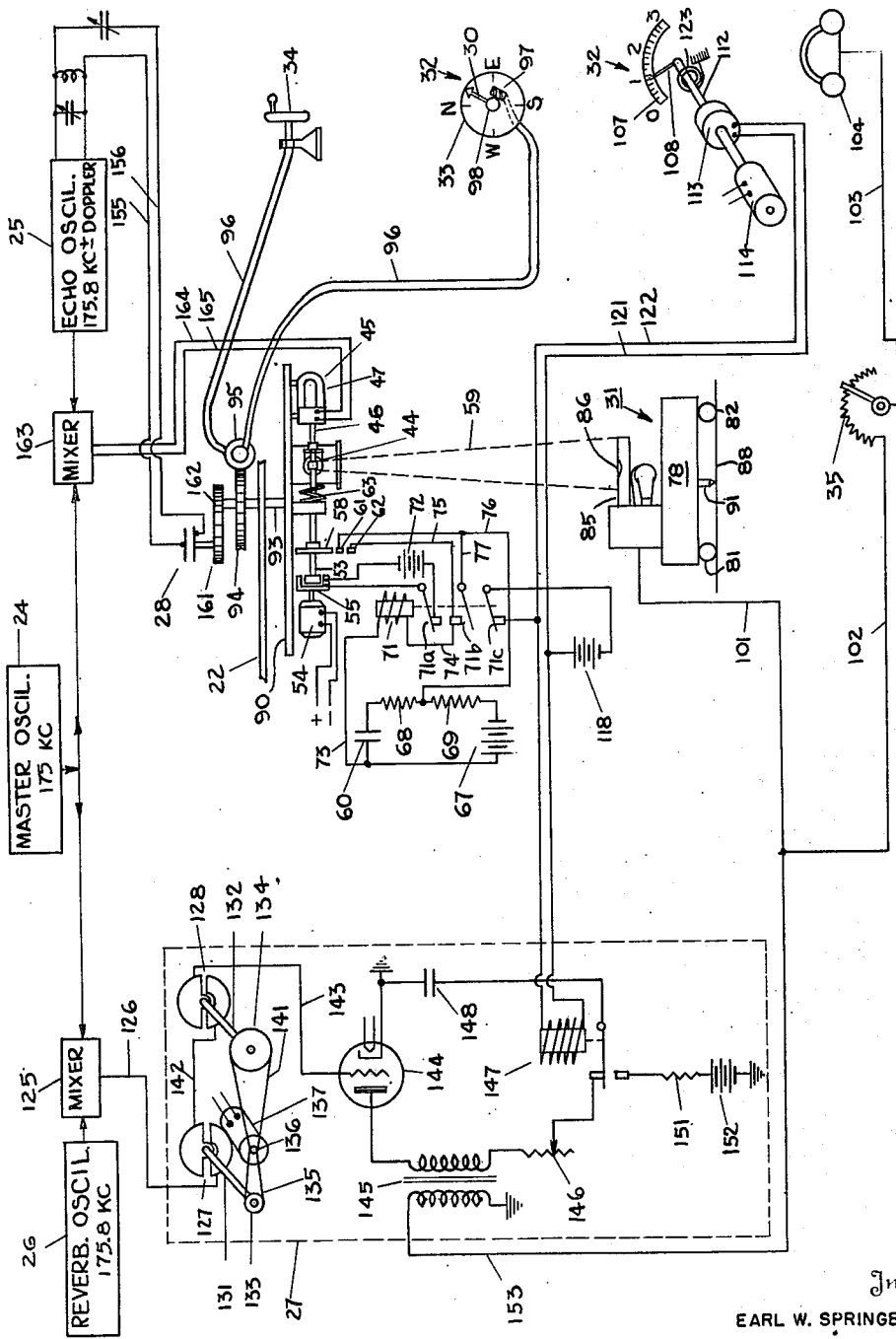

Oct. 10, 1950  E. W. SPRINGER  2,524,847
HERALD TRAINER
Filed Nov. 20, 1944  4 Sheets-Sheet 4

Inventor
EARL W. SPRINGER
By *T. E. Bush*
Attorney

Patented Oct. 10, 1950

2,524,847

UNITED STATES PATENT OFFICE 2,524,847

HERALD TRAINER

Earl W. Springer, Washington, D. C.

Application November 20, 1944, Serial No. 564,299

12 Claims. (Cl. 35—10.4)

(Granted under the act of March 3, 1883, as amended April 30, 1928; 370 O. G. 757)

This invention relates to an educational device for training personnel in the use of echo-ranging target detection systems. Although the educational device is described herein with respect to its application to a specific type of underwater sound echo-ranging apparatus, it is to be understood that principles of the invention may be applied to other types of echo-ranging apparatus without deviating from the spirit and scope of the appended claims.

In this application, the invention is described with relation to a type of equipment known as the "Herald". The term Herald is a coined expression and stands for harbor echo-ranging and listening device. As shown in Fig. 1, the Herald equipment comprises a direction sensitive transducer 14 which is located at any desired position within a harbor 15. The transducer is, of course, anchored under the surface of the water within a housing by any suitable securing means and is arranged to be rotated through 360° by suitable control means. Such means, not shown, may comprise a training motor which is geared to the transducer, the operation of the training motor being controlled remotely via an underwater cable 16 which extends from the transducer to a control station 17. This equipment is conventional and, for purposes of this application, it has not been deemed necessary to show its component parts in further detail.

Within the control station 17 is a transmitter oscillator, the output of which is usually in the supersonic frequency range, for example, 20 kc., a receiver and a keyer for alternately connecting the transducer 14 with the transmitter oscillator and receiver. When the transmitter oscillator is connected to the transducer by the keyer, a pulse of compressional wave energy, commonly referred to as a ping, is projected from transducer 14 into the water medium. Transducer 14 which is usually of the piezo-electric crystal or magnetostrictive type is of such design that the energy pulse is projected therefrom in the form of a beam. As the energy pulse leaves the transducer, the beam is quite narrow but as it proceeds further through the water the beam becomes wider. A typical beam pattern, in polar diagram is shown at 18 in Fig. 2. Since the transducer 14 is rotatable to any position around the underwater horizon, it is thus evident that the transmitted energy pulse may be beamed in any direction around harbor 15.

When the keyer disconnects the transmitter oscillator from transducer 14 and connects the latter to the receiver, the pulse is terminated and the apparatus is conditioned for receiving an echo. Thus, should an emitted pulse be intercepted by an underwater target such as a submarine 21, the echo of the pulse will travel back to transducer 14 and produce an echo signal at the terminals of the receiver. These echo signals may be indicated aurally to the operator by a suitable heterodyne arrangement which converts the supersonic frequency echoes to an audio note which in practice is usually around .8 kc.

In the usual operating procedure, the operator rotates transducer 14 around the entire underwater horizon in the harbor in steps. At each of these steps, which may be spaced 5° apart, the operator sends out a pulse and then waits for a certain length of time, which time varies with the range being searched, to see whether or not any echo is heard. If no echo is heard, transducer 14 is turned to the next 5° position and the procedure repeated.

When an echo signal is heard by the operator, he will then know that an underwater target is located along the bearing of the transducer 14 at which the echo pulse was received. Through conventional synchro equipment, the instant bearing of the transducer may, at all times, be indicated to the operator by means of a bearing scale and pointer which follows faithfully the motion of the transducer. The range of the target is, of course, proportional to the time required for the energy pulse to travel to and return from the target since the velocity of compressional wave energy in water is substantially constant, being of the order of 1600 yards per second, and may be indicated to the operator by a ranging device set into operation as each pulse is initiated.

If the transducer 14 is not "focused" directly on a target, that is with the axis $Ox$ of the beam pattern in Fig. 2 falling on the target, the aural signal received by the operator which corresponds to an echo pulse will be attenuated from its maximum. It will be lost entirely if the transducer is turned too far. Thus when a target is located, the operator endeavors to keep the transducer 14 so trained that the echo signal is always heard with maximum intensity. In this connection, it should also be noted that the intensity of the echo signal will also be attenuated in proportion to the range of a target.

Another characteristic present in this type of echo-ranging apparatus is the Doppler effect on the echo signal caused by motion of the target relative to the transducer. Thus, referring to Fig. 1, if the submarine target 21 is picked up when it is in the position shown, that is to say, seaward from the transducer and assuming the submarine to be headed on a course into the harbor, there is obviously a constantly closing range between the transducer and the submarine. Under such conditions, the frequency of the echo pulse will be higher than that of the transmitted pulse. This is commonly referred to as an "up-Doppler". On the other hand, if the submarine target has passed by transducer 14 on its way inward of the harbor, the range between the two will obviously be an opening one, with the result that the echo pulse is then received at a frequency lower than that of the transmitted pulse, this being commonly referred to as a "down-Doppler".

Still another characteristic of the energy pulse is termed reverberation. This may be defined generally as spurious echoes of the transmitted pulse from nearby objects, such as the harbor bottom, etc. and from the water itself, as distinguished from a true target echo. If the transmitted pulse is long enough and of sufficient strength to carry to and from the target with distinguishable intensity, the reverberation is, at times, quite noticeable. It varies in both frequency and intensity at random but the overall intensity pattern is usually marked by an initially high level followed by a general decrease in level with time.

During time of war when it becomes imperative to train a great number of operators in the use of echo-ranging target detection systems in a minimum length of time it is evident that the training process would be slowed considerably were it to be limited to instruction and practice in the operation of actual system installations such as a harbor installed Herald. Because of these undesirable limitations, it is obviously necessary to provide a suitable type of training device by which the actual operating technique of the installed equipment may be simulated. Such is the purpose of the invention which comprises the subject matter of this application.

The general object of the invention is, therefore, to provide an inexpensive and comparatively simple training device which will faithfully simulate all of the operating conditions which are to be found in an actual harbor installed Herald equipment or other echo-ranging systems similar thereto.

In the preferred embodiment of the training device to be presently described and in which like component parts are indicated by like reference numerals in the several views:

Figs. 1 and 2 have already been referred to;

Fig. 5 is a diagrammatic representation of the principal functional components of the device;

Figure 3:
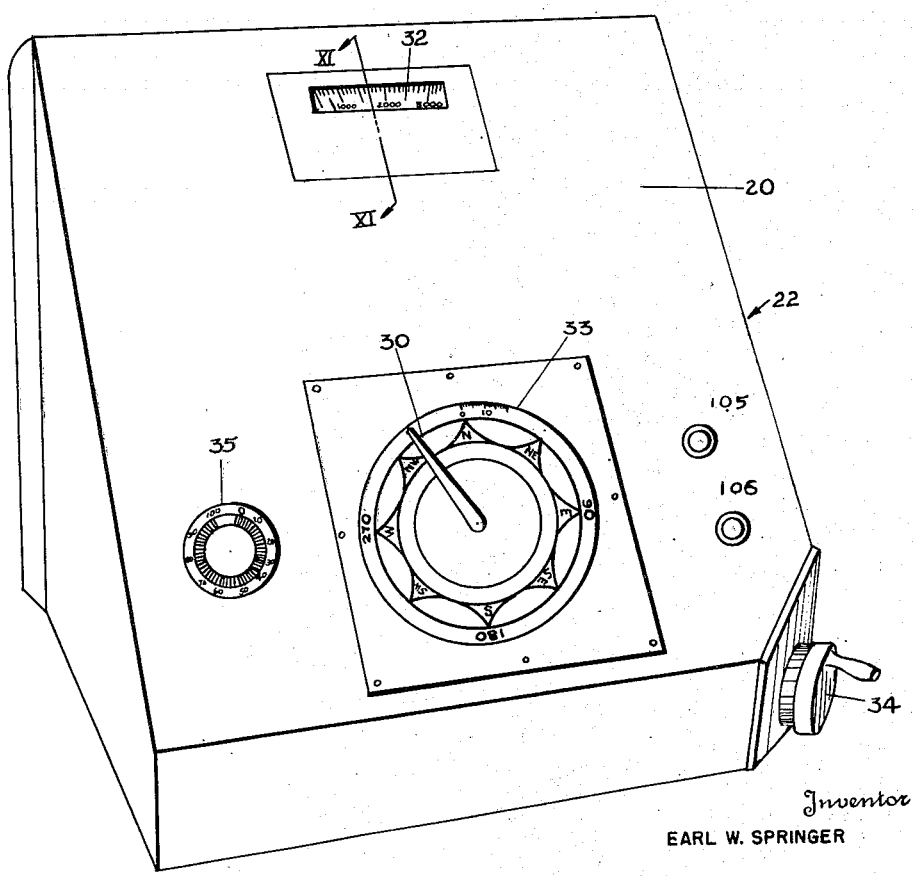
Fig. 3 is a perspective view of the control panel of the device showing the simulated transducer training means, the train angle indicator for the simulated transducer, the target range indicator, and the simulated pulse echo volume control.
Figure 4:
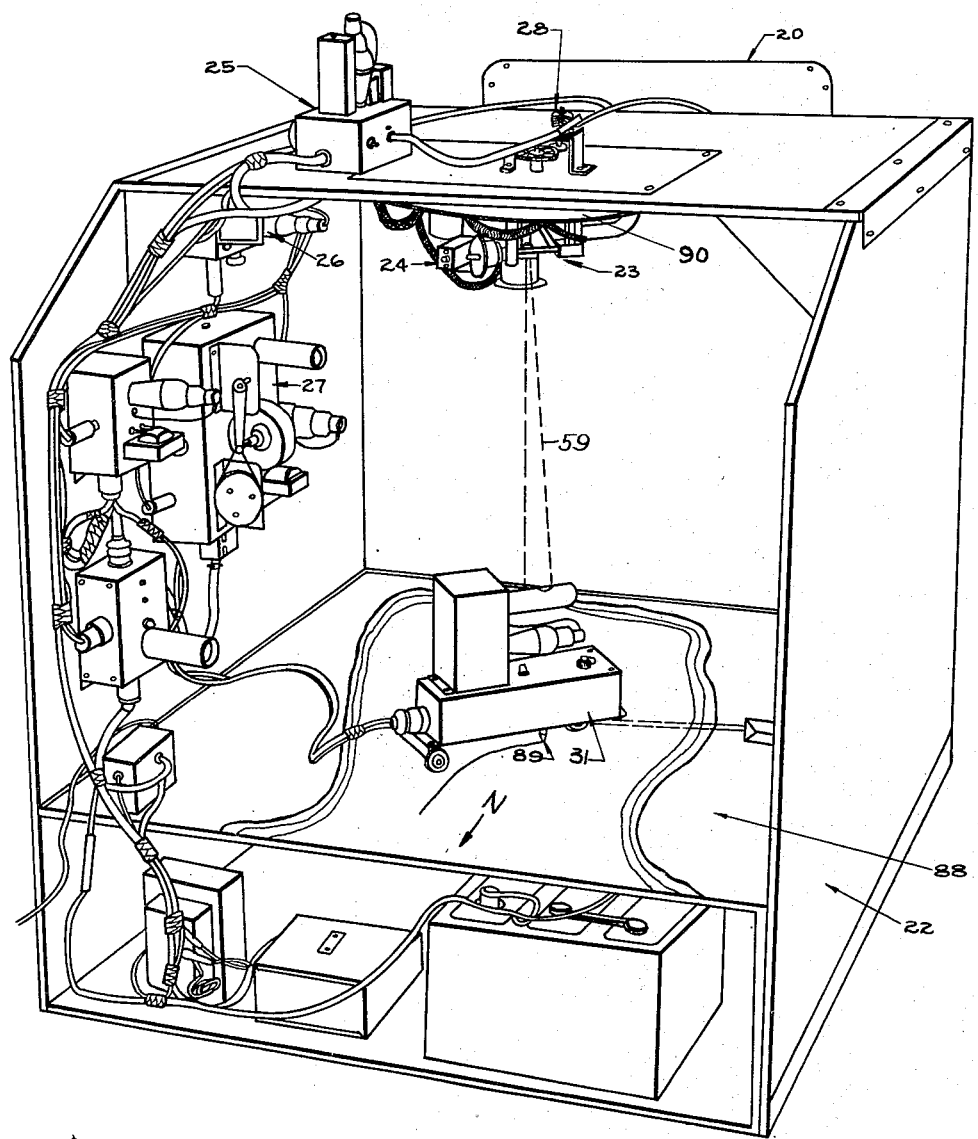
Fig. 4 is a rear view, in perspective, of the cabinet interior within which the principal functional components of the device are housed.

Referring now to the drawings, and in particular to Figs. 3 and 4, the complete trainer device is shown housed within a cabinet 22. Fig. 4 shows what is seen when looking into the rear of this cabinet. The control panel 20 for the device, which fits on the front of the cabinet 22, is shown quite clearly in Fig. 3, and preferably is of the console type of construction which permits an operator to be seated in a comfortable position while manipulating the controls.

The principal component parts of the trainer may be seen from the perspective views of Figs. 3 and 4. These parts include a scanner unit indicated generally at 23 to simulate the transducer 14 and pulse transmission, a master oscillator 24, an echo oscillator 25, a reverberation oscillator 26, a wobbler and decay unit 27, a Doppler condenser control unit 28, a mobile simulated submarine target 31, a target range indicator 32, an azimuth scale 33 and pointer 30 for indicating the instant train angle of the simulated transducer means, a hand wheel 34 for rotating the scanner unit by which changes in the train angle of the simulated transducer are effected, and a volume control 35 for adjusting the volume of the simulated target echo pulse.

The general principles of operation of this trainer device are based primarily upon the use of a selectively modulated light beam sweeping outward from a center position representing the position of the transducer 14 in the actual Herald equipment and at any bearing relative thereto. The beam sweeps at a rate representing to scale the propagation of the compressional wave pulse and its reflection or echo from a submerged target such as the submarine 21. The time interval is based upon a compressional wave velocity of 1600 yards per second. In other words, the sweeping modulated light beam simulates pulse transmission from transducer 14 and the return of the pulse echo thereto.

*Simulation of pulse transmission*

Figure 7:
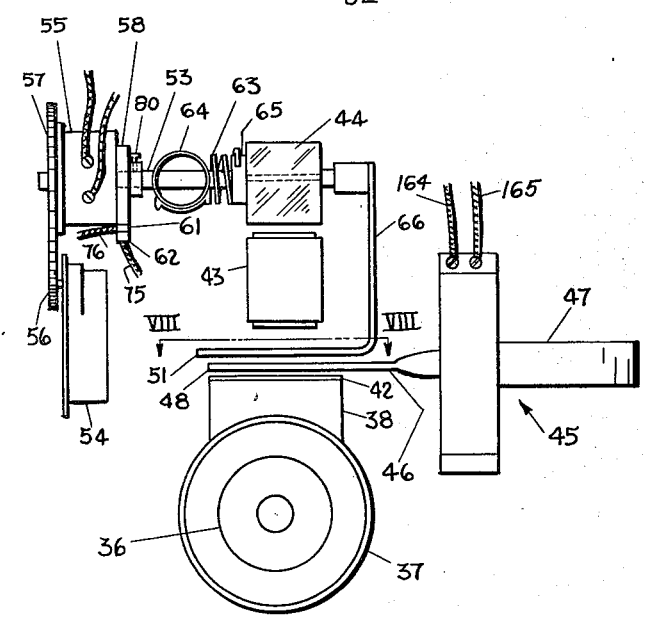
Fig. 7 is a plan view of the scanner shown in Fig. 1 which simulates the transducer.
Figure 8:
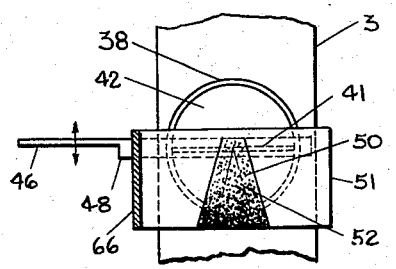
Fig. 8 is a detail of the means for modulating the light source in the scanner, and is taken on lines VIII—VIII of Fig. 7.

The means for producing the modulated light beam is contained within the unit which, for convenience, has been termed the scanner 23. A plan view of the principal components of the scanner is shown in Fig. 7. A further detail of the light modulator is shown in Fig. 8 and a diagrammatic representation of the functional parts of the scanner is also shown in Fig. 5.

Referring to these views, scanner unit 23 comprises a source of light 36 which may be contained within a housing 37. The light from source 36 passes from the housing 37 into a cylindrical side section 38, through a narrow, transversely extending, slit 41 in a mask 42, then into an objective lens system 43, and thence to a mirror 44. The light from source 36 is modulated by means of a modulation unit 45. This latter unit comprises a vibrator element 46 which is driven at the desired frequency by a motor unit including a horeshoe type magnet 47. Details of this unit have not been shown since it may be of the same construction as that found in conventional loud speaker units of the magnetic type. To the vibration member 46 of the unit 45 is attached a vane 48 which is adapted to move in a vertical plane to alternately expose and cover the narrow slit 41 in the mask 42.

It should be noted that a second mask 51 is disposed between the vane 48 and lens 43. This mask contains a V shaped slot 52 which is covered with a sheet of material 50 having a graded transparency characteristic. It is most transparent at the apex of the V. By means to be later described, mask 51 moves upward from the position shown in Fig. 8, which is the starting or zero range position, to thereby (1) steadily increase the effective width of the slit 41 through which the modulated light from source 36 is permitted to pass to mirror 44, and (2) simultaneously steadily decrease the intensity of this light.

Thus, as the vane 48 vibrates vertically at the driven frequency of the modulation unit 45 which, in the present embodiment, is set at .3 kc. for a condition of zero Doppler, a slit of modulated light of steadily increasing width and steadily decreasing intensity will be projected through the lens system 43 to the mirror 44. Mirror 44 is carried on a shaft 53 which is adapted to rotate periodically through a partial revolution by means of a motor 54 which runs continuously, and a magnetic clutch 55. The driving element of clutch 55 is connected to motor 54 by means of meshed gears 56 and 57 and the driven element is connected to shaft 53. The clutch unit 55 is conventional and has therefore not been shown in detail. Through a control arrangement that will be hereinafter described, which includes a cam 58 and contacts 61 and 62 closed momentarily by the land on the cam, magnetic clutch 55 is periodically energized. When this takes place, the driven element of the magnetic clutch 55 causes the shaft 53 to rotate until the contacts 61 and 62 close, at which time the control device previously mentioned functions to deenergize the magnetic clutch 55 during a dwell period thereby allowing the shaft 53 and the mirror 44 to return to their initial position under the restoring action of a torsion spring member 63, one end of which is connected to a fixed support 64, and the other end to a member 65 fixed to, and rotating with, the shaft 53. Also rotated with the mirror 44 and the shaft 53 is an arm 66 which carries the light mask 51.

Figure 2:
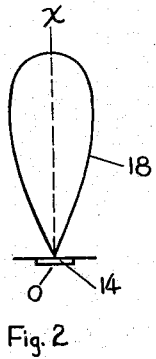

It will now be evident that each time that magnetic clutch 55 is energized, the shaft 53 and mirror 44 begin to rotate with the result that a beam 59 of modulated light is reflected downwardly and outwardly by mirror 44 from the center or zero range position in simulation of transmission of a pulse of compressional wave energy from transducer 14. Due to the action of mask 51, the beam becomes wider and decreases in intensity as it sweeps outwardly. Accurate simulation of the beam spread of an actual transmitted pulse, the polar pattern of which is shown in Fig. 2, together with attenuation of the pulse with range is thus produced. These will be further discussed in a later part of this specification under the heading "Operation."

The control arrangement previously referred to for periodically energizing the magnetic clutch 55 is shown schematically in Fig. 5. The arrangement includes a condenser 60 which is adapted to be charged from a source of power such as battery 67. The charging circuit includes two series connected resistors 68 and 69, resistor 69 having a relatively high resistance value as compared to that of resistor 68.

Also included in the control is a relay 71 containing contacts sets 71a, 71b and 71c. A source of power, such as a battery 72, is connected to the winding of magnetic clutch 55 through the upper contact set 71a of relay 71 and it will be observed that this circuit is closed when the armatures of relay 71 are in their down or deenergized positions. A conductor 73 extends from one side of condenser 60 through the energizing winding of relay 71 and conductor 74 to the stationary contact of contact set 71b of the relay and thence via conductor 75 to contact 62. From contact 61, a conductor 76 extends to a tap intermediate the resistors 68 and 69. It will also be observed that the circuit from the condenser 60 through the winding of relay 71 and conductor 74 will be shunted around the contacts 61, 62 when relay 71 becomes energized and the contacts of contact set 71b of this relay close.

The operation of the control is as follows:

Assuming the elements to be in the positions shown in Fig. 5, it will be observed that with the contacts of contact set 71a of the relay 71 closed, the magnetic clutch 55 is energized from battery 72. Under these conditions, as previously explained, the shaft 53, cam 58 and mirror 44, begin to rotate from their initial or starting position. When the shaft 53 is rotated to a point where the land on cam 58 causes contacts 61 and 62 to close momentarily, it is seen that a circuit for discharging the condenser 60 (which has been charged previously by means of battery 67) is completed through the conductor 73, the winding of relay 71, conductors 74 and 75, closed contacts 61—62, and conductor 76 back to the tap intermediate the resistors 68 and 69. Thus the charge accumulated on condenser 60 flows through the winding of relay 71 causing it to pull in the armatures of its three contact sets. When this occurs, it is seen that the circuit through the upper contact set 71a is broken which thereby opens the circuit between the battery 72 and the magnetic clutch 55. This breaks the magnetic coupling between the driving and driven elements of this clutch allowing shaft 53 and the elements carried thereby to reverse their direction of rotation under the restoring force which has been built up within the torsion spring 63 and start back to the position which they initially occupied.

However, as previously described, contacts 61 and 62 are only closed momentarily by the land on cam 58. Thus as the shaft 53 begins its rotation in a reverse direction, and these contacts 61 and 62 open, it is seen that the discharge circuit for condenser 60 through the winding of relay 71 which had theretofore been completed through the closing of contacts 61 and 62, is broken. Were the winding of relay 71 to be permitted to become deenergized with the opening of contacts 61 and 62, it is evident that magnetic clutch 55 would become reenergized immediately with the result that shaft 53 would never reach its initial starting position. However, by completing a holding circuit for the discharge of condenser 60 through the then closed contacts of contact set 71b of relay 71 to conductor 76 via conductor 77, relay 71 is maintained in an energized state until the charge on condenser 60 has decreased to such a value that it is no longer able to supply enough current to the winding of this relay to hold in its contacts. When this occurs, the contacts of relay 71 move to their open position, the magnetic clutch 55 is again energized and the cycle repeated. The period during which the relay 71 remains energized sufficiently to hold in its contacts has been termed the dwell period and the length of this period may be regulated by adjusting the size of condenser 69 and its discharge resistor 68. It was stated that resistor 69 has a relatively high resistance when compared to that of resistor 68. This arrangement is desired to limit current flow from battery 67 through the winding of relay 71 via contact set 71b so that the relay 71 will open when condenser 69 has discharged sufficiently.

*Simulation of submarine target*

Figure 6:
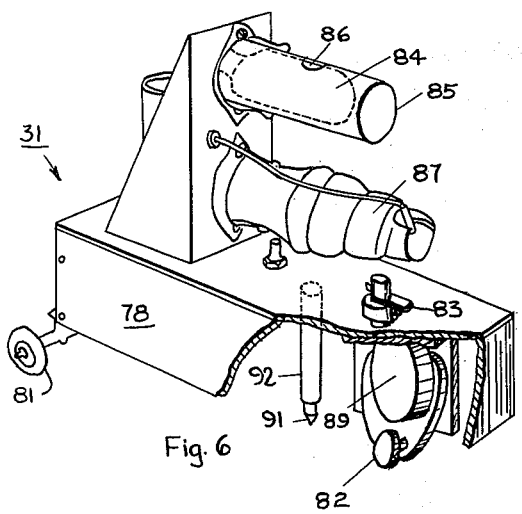
Fig. 6 is a view, in perspective, of the driven carriage which simulates the submarine target.

The mobile carriage 31 which is used for simulating a submarine target is shown in Figs. 4, 5 and 6. Referring to these figures it is seen that the carriage comprises a box-like chassis 78 which is provided with a pair of rear wheels 81 and a single front wheel 82 which may be turned to any position by means of a suitable handle 83. Disposed on top of the carriage is a unit which comprises a photo-electric cell 84 which is carried within a cylindrical housing 85, the latter including a top light entrance opening 86. A conventional electronic amplifier unit, including amplifier tube 87, is provided for obtaining an output which will be proportional to the amount of light which may be reflected downwardly from the mirror 44 through the opening 86 in the casing 85 and into the photo-electric cell 84.

Carriage 31 is arranged to run over a chart 88, which represents an actual harbor installation of the Herald equipment, at a speed of approximately three knots, as related to the scale of the chart, by means of a motor 89 which is geared down to drive the front wheel 82 at the proper speed. However, carriage 31 may be run at other speeds to simulate other speeds of the submarine target.

If desired, a pencil 91 may be supported within a holder 92 which is fixed to the box frame of the carriage in a line directly beneath the opening 86 in the photo-electric cell housing 85 to mark out the course taken by the carriage which simulates the course taken by the underwater submarine target 21 entering the harbor 15. Since the front wheel 82 of the carriage 31 is adjustable, the carriage may be set on any curved or straight target course desired to be simulated.

Referring now to Figs. 4 and 5, it is seen that the scanner unit 23, which has already been described, is suspended beneath a plate 90, the latter being mounted on, and arranged for rotation with, a shaft 93. Shaft 93 is suitably journalled in the top wall of the cabinet 22. The means for rotating plate 90 and hence the scanner unit 23 comprises a gear 94 which is meshed with a worm 95. Rotation of worm 95 is effected through a flexible shaft 96 which extends to the hand wheel 34 shown in Figs. 3 and 5. The flexible shaft 96 also extends to the console control panel 20 previously referred to. There it drives a worm 97 which in turn rotates a gear 98 to which the pointer 30 of the bearing indicator 32 is attached.

From what has been described, it is seen that the scanner unit 23 is rotatable by the operator to any bearing desired by turning the handle 34, and that at any such position which is indicated by the pointer 30 on scale 33, the periodic energization of magnetic clutch 55 causes the shaft 53 and mirror 44 to turn periodically thru a partial revolution. In this manner the periodic modulated light beam of steadily increasing width and steadily decreasing intensity which is directed downwardly by mirror 44 is swept outwardly from the center, or zero range position, in simulation of the transmission of a pulse of compressional wave energy from transducer 14 at a desired bearing within the harbor 15.

Now should any portion of the modulated light beam 59 in its outward sweep intercept the moving carriage 31 and enter the opening 86 in casing 85 and impinge upon the light-sensitive cell 84, an amplified signal at the light modulation frequency will be fed over conductors 101 and 102, volume control potentiometer 35, and conductor 103 to the headphone set 104. If desired, two of these headphone sets may be provided, one for the student operator and one for the instructor. These may be plugged in at conventional jacks 105, 106 on the console control panel 20. When the signal is received, the operator will then know that the simulated transmitted pulse has intercepted a target and returned to the simulated transducer.

If the sweeping beam 59 should fall across the entire area of the opening 86, it is evident that the light sensitive cell 84 will be affected to a maximum degree with the result that the simulated pulse echo signal transmitted to the operator will be at a maximum. This indicates to him that the simulated transducer (scanner unit 23) is focussed directly on the target. However should the beam 59 in its sweep fall across only a portion of the opening 86, it is evident that the light sensitive cell 84 will be affected to a degree less than maximum with the result that the simulated pulse echo signal heard by the operator will also be less than maximum. This is indicative that the simulated transducer is not focussed properly on the target and the operator will therefore turn the scanner unit 23 slightly in one direction or the other so as to receive a simulated pulse echo with maximum intensity. This arrangement then closely simulates actual operation conditions of the Herald and other underwater echo-ranging systems where the pulse echo will be attenuated from maximum if the axis Ox of the pulse pattern (see Fig. 2) does not fall on the target.

*Target Range Indication*

Figure 11:
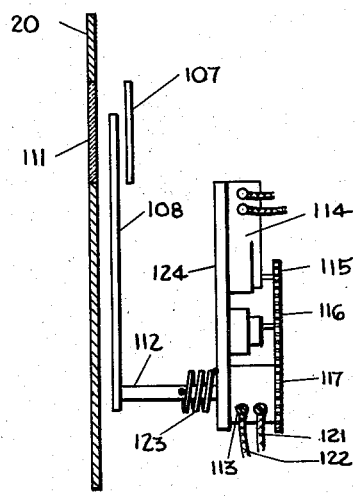
Fig. 11 is a detail view, partly in section, showing the operating components of the range indicator, and taken on lines XI—XI of Fig. 3.

The device for indicating to the operator the range at which the simulated pulse strikes the simulated target is shown in Figs. 3, 11, and also diagrammatically in Fig. 5. Referring now to these figures, the range indicator comprises a range scale 107 and a pointer 108. These two components are located behind the control panel 20 and are visible to the operator through a glazed window 111.

The pointer 108 is connected to the end of a shaft 112 and rotation of the latter is obtained by connecting it to the driven element of another magnetic clutch 113. The driving element of clutch 113 may be driven continuously from a motor 114 which is geared down through meshed gears 115, 116 and 117 to the desired speed.

Clutch 113 is adapted to be energized from a source such as a battery 118 through contact set 71c of relay 71 and via conductors 121, 122 during the time that this relay is deenergized. Thus when clutch 113 is energized, the driven element rotates shaft 112 and hence sweeps pointer 108 over the range scale 107.

It will be recalled that shaft 53 and mirror 44 of the scanner unit 23 also begin their rotation as soon as relay 71 is deenergized. Thus the necessary synchronization between the outward sweep of the modulated light beam and the range indicator is effected.

When relay 71 becomes energized, at which time the dwell period is started, the circuit between battery 118 and magnetic clutch 113 is broken. This breaks the magnetic coupling between the driving and driven elements of this clutch allowing shaft 112 and pointer 108 to return to their starting positions under the restoring force which has been built up in torsion spring 123, one end of which is secured to shaft 112 and the other to a fixed support 124 which carries the motor 114 and clutch 113.

*Simulation of reverberation*

In the opening part of this specification, it was explained that in the operation of underwater sound echo-ranging systems such as the Herald, many spurious echoes of the transmitted energy pulse arise; that these echoes are of random frequency which center about the frequency of transmission; and that their overall intensity pattern usually exhibits a relatively high level at the start of the reverberation followed by a general decrease in level with time. In order to accurately simulate this reverberation effect in the trainer apparatus to which this application relates, the following components are provided.

The reverberation oscillator 26 previously referred to is set to produce an output frequency of 175.8 kc. This output feeds into a mixer 125 of conventional construction and there combines with the output from master oscillator 24 also previously referred to. The difference frequency of .8 kc. is taken out of mixer 125 over conductor 126 into the wobbler and decay unit 27.

The wobbler and the decay unit 27 produces the diminishing intensity effect of the reverberation and also gives it a fluctuating frequency characteristic. This unit includes a pair of variable air condensers 127 and 128. The rotor elements of condensers 127 and 128 are connected by shafts 131 and 132, respectively, to pulleys 133 and 134. A belt 135 extends from the pulley 133 to one groove of a double grooved pulley 136 on a shaft of motor 137. Similarly, a belt 141 extends from pulley 134 to the other groove of pulley 136. It is seen that pulleys 133 and 134 are of different diameters. Accordingly, the rotor elements of the condensers 127 and 128 will be driven at different speeds by motor 137.

Condensers 127 and 128 are connected in series. That is, the output of mixer 125 which is taken over conductor 126 connects to the stator plates of condenser 127, rotor elements of condenser 127 are connected to the stator elements of condenser 128 by conductor 142, and rotor elements of condenser 128 are connected to conductor 143.

An electronic amplifier 144 is provided in the wobbler and decay unit 27. It is seen that the input grid to this amplifier 144 is connected to conductor 143. Accordingly, the grid input to amplifier 144 will be the .8 kc. output from the mixer 125 modified by the random changes produced therein by the action of the condensers 127 and 128.

The anode-cathode circuit of amplifier 144 includes the primary winding of a transformer 145, a variable resistor 146, the contacts of a relay 147 and a condenser 148. It is seen that the lower contact of the relay 147 also has connected thereto a resistor 151 and a source of potential such as the battery 152. A conductor 153 leads from the secondary of transformer 145 to conductor 102 and thence via potentiometer 35 and conductor 103 into the headphone set 104. Operation of the wobbler and decay unit 27 is as follows:

It has previously been explained that as soon as relay 71 becomes deenergized, the magnetic clutches 55 and 113 become energized. Accordingly, shaft 53 of the scanner unit 23 begins to rotate and pointer member 108 of the range indicator begins to move over the range scale 107. Since conductors 121 and 122 in the circuit of clutch 113 also extend to the winding of relay 147, it is evident that this latter relay will pull in its armature causing it to move against the upper contact and remain there for as long as the relay 71 is in a deenergized state. It will also be observed that when relay 147 is in its deenergized state with its armature against the lower contact, a charging circuit for condenser 148 is completed, this circuit extending from ground to one side of the battery 152, through charging resistor 151, the lower contact and armature of relay 147 and through condenser 148 to ground.

Thus at the instant that magnetic clutches 55 and 113 of the scanner and range indicator units, respectively, are energized, the reverberation decay condenser 148 is disconnected from its charging circuit by operation of relay 147 and begins to discharge through the anode-cathode circuit of amplifier 144. The current through the amplifier 144 will be modulated by the action of the grid element of this tube which, as previously described, has a random characteristic centering around the .8 kc. output from mixer 125. Accordingly, the current in the anode-cathode circuit of amplifier 144, which passes through the primary of transformer 145, will have the same frequency characteristic as that of the grid circuit of this tube. Obviously, the current which flows from the secondary of transformer 145 out over conductors 153, etc. into headphone set 104 will also have this same frequency characteristic.

As the charge on condenser 148 decreases, the current in the anode-cathode circuit of amplifier 144 and hence that through the primary winding of transformer 145 will likewise be decreased with the result that the output of the secondary of this transformer will be reduced thus causing the reverberation signal to decrease. Preferably the time constant of reverberation decay condenser 148 and the reverberation amplifier 144 is such that at the maximum range, the intensity of the reverberation signal will have diminished to about one-tenth of the original impulse value of this signal intensity at the start of the travel of the light beam from the center or zero range position on the chart 88.

The operator thus hears a simulated reverberation signal which begins with maximum intensity and of wobbling frequency each time the light beam of the scanner unit 23 starts from the zero range position and thereafter decreases in intensity with simulated range in true simulation of actual operating conditions found in the Herald equipment.

*Simulation of Doppler effect on pulse echo*

It has also been previously explained that in the operation of underwater sound echo-ranging equipment, the frequency of the pulse echo will differ from that of the transmitted pulse if there is relative motion between the transducer and target. This, it will be remembered, is commonly known as Doppler. Thus in this particular trainer device which simulates operation of a Herald system, it is essential that the Doppler effect be introduced since the trainer includes the mobile carriage 31 which simulates an underwater target 21 moving into or out of harbor 15.

Figure 10:
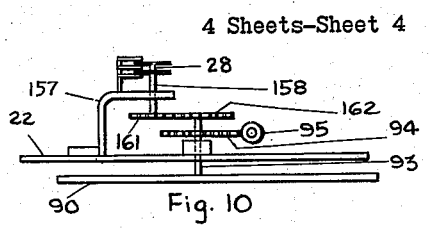
Fig. 10 is a detail of the capacitor shown diagrammatically in Fig. 9.

The component for producing the Doppler effect in the simulated pulse echo is the variable air condenser 28 previously referred to which is connected via conductors 155, 156 into the frequency control circuit of the echo oscillator 25 (see Fig. 5). As clearly shown in Fig. 10, the stator element of condenser 28 is supported by a bracket 157, the latter being secured to the top wall of the cabinet 22. The rotor element of condenser 28 is fixed to the top of shaft 158. A gear 161 secured to the bottom of shaft 158 meshes with gear 162 and the latter is secured to shaft 93.

It will be remembered that shaft 93 and the scanner unit 23 rotate when handwheel 34 is turned by the operator to effect a change in bearing of the simulated transducer 14. Referring now to the particular Herald installation being simulated which is pictured in Fig. 1 and shown on the chart 88 in Fig. 4, it will be seen that "North" i. e. 0° bearing is seaward of the harbor 15. Accordingly it can be assumed that all submarine targets to be detected will be approaching the harbor 15 from a relatively "North" position. With this assumption, it is evident that the only way in which a submarine target can cross the range circle of detection, which for example may have a radius of 3000 yards, with transducer 14 at the center, is to approach transducer 14 at a closing range thereby causing an "up-Doppler" in the pulse echo. When the submarine target reaches an "East" (90°) or "West" (270°) position relative to transducer 14, the Doppler effect is zero since the range rate at this point is neither closing or opening. However as the submarine target passes from either of these bearings further into the harbor 15, the range rate between it and the transducer 14 will be an opening one and hence cause a "down-Doppler" in the pulse echo. In other words, if the operator should detect a submarine approaching the harbor to seaward of transducer 14, the pulse echo will be at a frequency higher than that of the transmitted pulse. But if on the other hand, the submarine is not detected until it has passed the transducer 14, the pulse echo will be heard at a frequency lower than that of the transmitted pulse.

Thus when the scanner unit 23 occupies such a position that the modulated light beam 59 is projected outwardly along the "North" or 0° bearing, the coupling between the rotor and stator plates of condenser 28 is at a maximum (see Fig. 9) and its effect upon the frequency control circuit of echo oscillator 25 is such that the normal output frequency of 175.8 kc. is raised above this value to the selected maximum which may, for example, be 176.1 kc. When the output from echo oscillator 25 at 176.1 kc. is mixed in mixer 163 with the 175 kc. output from master oscillator 24, the difference frequency output from mixer 163 will accordingly be 1.1 kc. This latter output feeds the light modulation unit 45 previously described over conductors 164, 165 with the result that the light beam 59 is similarly modulated at 1.1 kc. Should now the light beam in its outward sweep impinge upon the light sensitive cell 84, the operator will hear the simulated echo at a frequency of 1.1 kc. Since the frequency of the simulated reverberation centers around a value of .8 kc., which is equivalent to the transmission frequency, the operator will accordingly hear the echo with an "up-Doppler" which is the correct effect.

Figure 9:
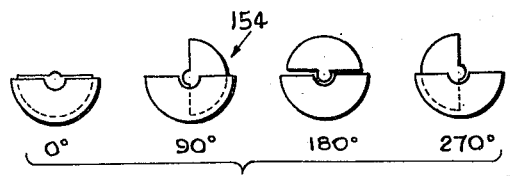
Fig. 9 is a diagrammatic representation showing the various positions taken by a capacitor unit, the operation of which functions to superimpose the correct amount of simulated Doppler effect on a simulated target echo pulse.

When the scanner unit 23 is turned 90° to an "East" position, the coupling between the stator and rotor plates of condenser 28 has been decreased, the plates then occupying the positions shown over the 90° mark in Fig. 9. As previously explained, the Doppler effect on the pulse echo at this bearing is zero since the range rate at this point is substantially neither an opening or closing one. The coupling between the rotor and stator plates of condenser 28 is now such that its effect upon the frequency control circuit of echo oscillator 25 will result in an echo oscillator output of 175.8 kc. When this is beat in mixer 163 with the 175 kc. output from master oscillator 24, the difference frequency will be at .8 kc. Thus should the operator detect a simulated submarine target due "East," the simulated echo pulse will be at a frequency of .8 kc. This frequency is the same as that around which the simulated reverberation is heard by him, and hence produces the operating condition which simulates very closely the operating conditions of an actual Herald installation when submarine 21 is due "East" of transducer 14.

When scanner unit 23 is turned further to simulate a "South" train angle of transducer 14, the coupling between the stator and rotor plates of condenser 28 has been further decreased to a minimum, the plates then occupying the positions shown over the 180° legend in Fig. 9.

The Doppler effect on the pulse echo at this bearing has a maximum "down" characteristic. Hence the coupling between the rotor and stator plates of condenser 28 (now at a minimum) is such that its effect upon the frequency control circuit of echo oscillator 25 will result in an echo oscillator output of 175.5 kc. When this is beat in mixer 163 with the 175 kc. output from master oscillator 24, the difference frequency will be at a frequency of .5 kc. Thus should the operator detect a simulated submarine due "South," the simulated pulse echo will be at a frequency of .5 kc., which is .3 kc. lower than that of the reverberation center frequency therefore simulating the actual Herald operation conditions for a submarine target 21 intercepted "South" of transducer 14.

When scanner unit 23 is turned further to a "West" position, the coupling between the stator and rotor plates of condenser 28 is as shown over the legend 270° in Fig. 9. It will be evident that the capacity coupling is now the same as it was when in the "East" or 90° position. Hence its effect upon the output frequency of echo oscillator 25 is the same. That is, the output frequency of this oscillator will be at 175.8 kc. with the result that any simulated pulse echo picked up by the operator will be at .8 kc. which is the correct value for simulating operating conditions of a Herald with a submarine target 21 at this bearing relative to transducer 14.

For any target bearing intermediate the "North," "East," "South," or "West" bearings, the amount of the Doppler effect on the simulated pulse echo will vary in substantially the proper amount.

It will now be evident from what has been described that in the trainer device of this application, the Doppler effect on the simulated pulse echo is introduced automatically for any target bearing.

Figure 1:
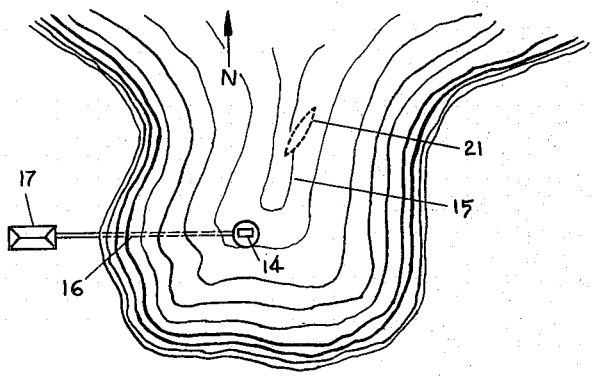

Thus for the particular harbor installation shown in Fig. 1 which is simulated by the trainer apparatus, there is a maximum "up-Doppler" for a submarine target located due "North" of the simulated transducer position, a maximum "down-Doppler" for a target due "South," and "zero-Doppler" for a target either due "East" or due "West."

While it may be conceded that the means described for introducing the Doppler effect on the simulated target pulse echo is subject to a small error, it is generally correct. The error is of little significance when compared to the advantage of the simplicity of the means for automatically introducing its effect in a trainer device of this nature.

In using the trainer device for simulating operation of a different Herald installation, the arrangement of the Doppler condenser 28 would, of course, be such that the maximum Doppler effect will occur at the bearing which is seaward of the transducer element of the particular Herald installation that is being simulated. Thus for example, were the harbor associated with the Herald to be so geographically situated that the seaward bearing of the transducer 14 was "East" rather than "North" as heretofore described, the maximum "up-Doppler" would occur when the scanner unit 23 was turned to a position corresponding to "East" and the maximum "down-Doppler" would occur when the scanner unit 23 has been turned to a position corresponding to "West."

*Operation*

Although the operation of each of the component parts of this trainer apparatus has already been explained, it is believed that a further general description of the operation of the trainer device as a whole will be conducive to a more thorough understanding of the invention. The complete trainer device operates in the following manner:

The operator is preferably seated in front of the console control panel 20 and given a general explanation of the manner in which the trainer device functions and what it is supposed to simulate. It is assumed that the chart 88 has already been placed in position inside of the cabinet 22 and in this connection it should be stated that the chart is so placed with relation to the scanner unit 23 that when the shaft 53 and the reflecting mirror 44 are in their starting or zero range position, the light which comes through from the source of 36 and is deflected perpendicularly downward by the mirror 44 will fall on the transducer element 14, which is shown on the chart 88.

The mobile carriage 31, which as previously explained simulates a submarine target 21 in motion is then set to run over chart 88 along any particular course, which may be either curved or straight as determined by the setting of the front wheel 82, that an instructor desires it to follow.

Figure 12:
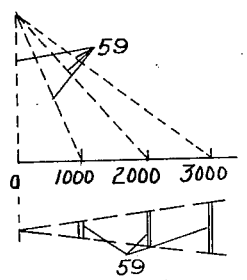
Fig. 12 shows how the area of the light beam of the scanner unit varies with range.

Through suitable conventional control switch means, which have not been shown in the drawings, motor 54 is started. Accordingly relay 71 will be periodically energized and deenergized in accordance with the particular constants which have been selected for the control circuit previously described which controls the energizing and deenergizing periods for this relay. Simultaneously with each deenergization of relay 71, shaft 53 carrying the mirror 44 will begin to rotate causing the modulated light beam 59 to sweep outwardly from the position of the transducer 14 on chart 88 which, as has previously been explained, is the zero range position (see Fig. 12). At the zero range position, light beam 59 is practically a point of light. However, as it sweeps outwardly, its width increases steadily in simulation of the spread characteristic of the compressional wave energy pulse which is emitted from transducer 14 of a Herald system. The area of the light beam 59 on chart 88 for range positions of 1000, 2000 and 3000 yards is shown in Fig. 12.

Each time that relay 71 is deenergized, magnetic clutch 113 is energized which causes pointer member 108 to move over the range scale 107. Also at this time, relay 147 is energized with the result that as pointer member 108 starts to move across range scale 107, a signal simulating reverberation will pass over the circuit including conductors 101, 102, volume control 35 and conductor 103 into the headphone set 104. The operator thus hears the simulated reverberation at the time pointer 108 begins to move over the range scale 107. This is, of course, indicative to him that a simulated pulse of compressional wave energy has been sent out. Due to the action of the wobbler and decay unit 27, the simulated reverberation signal will have a changing frequency and its intensity will be gradually decreased.

When shaft 53 is rotated to the position where contacts 61 and 62 are closed by cam 58, relay 71 is then energized by the discharge of condenser 60, at which time magnetic clutch 55 is deenergized and shaft 53 carrying mirror 44 is caused to fly back to its initial starting position. At the same time, range pointer 108 is also caused to fly back to the zero range position on range scale 107. The cycle then repeats itself when relay 71 again becomes deenergized at the end of the dwell period which is determined by the amount of the charge stored in condenser 60.

Depending upon the particular Herald installation being simulated, the position of cam 58 on shaft 53 relative to contacts 61 and 62 will of course be so adjusted by means of a screw 80 that modulated light beam 59 will sweep over the entire harbor of the geographical area portrayed on the chart 88 before fly-back occurs.

Assuming that when the training device first begins to operate, the light beam 59 in its outward sweep does not fall into any part of the opening 86 in the housing 85 of the photo-electric cell 84, the operator will, of course, receive no simulated target echo signal of the simulated transmitted pulse. Under these conditions, the operator is then instructed to manipulate the hand wheel 34 in the same manner that he would manipulate the train control for transducer 14 of an actual harbor installed Herald system to search for the submarine target 21 which, as previously described, is simulated by carriage 31 moving over chart 88. Thus when the operator sees range pointer 108 move back to the zero range position without hearing a simulated echo signal he will, during the dwell period aforementioned, turn hand wheel 34 until pointer member 30 of the bearing indicator 33 has moved through a 5° indication. As previously explained, such motion of the hand wheel 34 also causes the scanner unit 23 to rotate through a corresponding change in bearing. Thus when the next simulated pulse is transmitted, the modulated light beam 59 will move outwardly from the zero range position along the new bearing selected by the operator. Ultimately the operator will have so trained the scanner unit 23 that when the beam 59 sweeps outwardly from the zero range position, it will fall in at least part of the opening 86 in the housing 85 of the photo-electric cell 84, When this occurs, a signal corresponding to an echo of the simulated transmitted pulse will be amplified in tube 87 supported on the carriage 31, which signal is then fed over conductors 101 and 102, volume control 35 and conductor 103 into the headphone set 104. The operator will then know that a simulated submarine target has been detected. On subsequently following simulated pulse transmissions, the operator will, of course, make such minor changes in the bearing of the scanner unit 23 until the position of the beam 59, with respect to carriage 31, is such that beam 59 falls across all of the area of the opening 86. Under these conditions, the echo signal heard by the operator will then be at its maximum intensity which, as previously explained, is indicative of the fact that the simulated transducer is trained directly on the simulated target. In an actual Herald installation this is equivalent to a bearing of transducer 14 such that the axis Ox of the projected beam 18 is lined on the target 21.

The frequency of the simulated echo signal heard by the operator will be the same as that of the modulated light beam 59 and will vary with the amount of Doppler effect introduced by the action of condenser 28 on the frequency control circuit of echo oscillator 25.

When the operator has the trainer device so adjusted that the simulated echo signal is being received at maximum intensity, he notes the bearing as indicated by pointer 30 on bearing scale 33, and also the position of the pointer member 108 on the range scale 107 at the instant the echo signal is received. Bearing and range are then called out by the operator to an assistant who may be positioned behind him, and this assistant plots the range and bearing on a chart of the particular Herald installation being simulated which is pictorially represented on chart 88.

As carriage 31 moves along its pre-set course, the operator will endeavor to keep the simulated transducer 23 so trained that a simulated pulse echo signal is received for each simulated pulse transmitted. Accordingly each time that the simulated pulse echo signal is received, the operator will call out the range and bearing to the assistant from which the course of the simulated submarine target can be plotted.

At the end of the "run" of carriage 31, the plot which has been drawn from the range and bearing data called out by the operator can then be compared with the course of the simulated target 31 as recorded by it on chart 88 by pencil 91. By comparing the two plots with each other, the skill of the operator can then be ascertained.

In conclusion, I desire it to be expressly understood that while the embodiment of the invention which has been shown and described is to be preferred, it is evident that changes may be made in the particular construction and arrangement of parts shown without departing from the spirit and scope of the invention as defined in the appended claims. Also as previously stated, principles of the invention may be applied to echo ranging target detection systems other than the Herald.

The invention described herein may be manufactured and used by or for the Government of the United States of America for governmental purposes without the payment of any royalties thereon or therefor.

What is claimed is:

1. In a trainer device for simulating operation of an echo-ranging target detection system, wherein the simulated pulse transmission comprises means for producing a beam of modulated light, means for sweeping said light beam outwardly from a simulated zero range position, and shutter means of varying transparency for decreasing the intensity of said light beam as it moves from said simulated zero range position.

2. In a trainer device for simulating operation of an echo-ranging target detection system, wherein the simulated pulse transmission comprises means for producing a beam of modulated light, means for sweeping said light beam outwardly from a simulated zero range position, means for increasing the width of said light beam as it moves from said simulated zero range position, and means for decreasing the intensity of said light beam as it moves from said simulated zero range position.

3. In a trainer device for simulating operation of an echo-ranging target detection system, means for producing a beam of modulated light, means for sweeping said light beam outwardly from a simulated zero range position, said last means increasing the width and decreasing the intensity of said beam as a function of the distance from said zero range position, a light-sensitive pick-up unit simulating a target, and signal means simulating an echo signal actuated by said pick-up unit as the latter intercepts said sweeping light beam.

4. In a trainer device for simulating operation of an echo-ranging target detection system, means for producing a beam of modulated light, means for sweeping said beam outwardly from a simulated zero range position, said last means increasing the width and decreasing the intensity of said beam as a function of the distance from said zero range position, a mobile omnidirectional light-sensitve pick-up unit simulating a target in motion, and signal means simulating an echo signal actuated by said pick-up unit as the latter intercepts said sweeping light beam, said signal means being an electronic oscillator.

5. In a trainer device for simulating operation of an echo-ranging target detection system, means for producing a simulated reverberation signal comprising an oscillator, means for introducing a wobbling frequency effect into the output of said oscillator, an amplifier tube, means connecting the output of said oscillator to a control grid of said amplifier tube, a condenser, a charging circuit for said condenser, relay means for alternately connecting said condenser to said charging circuit and into the cathode-anode circuit of said amplifier tube, and receiver means responsive to the discharge of said condenser through the said cathode-anode circuit of said tube.

6. In a trainer device for simulating operation of an echo-ranging target detection system, the combination of a beam projection device for beaming a simulated transmission pulse, detection means movable within the range of said projection device for detecting said pulse, means for producing a simulated echo pulse including an oscillator, receiver means coupled to said detection device, means for automatically varying the frequency of said oscillator according to the position of said beam projection device, means for aurally reproducing a simulated echo pulse when said detection device intercepts said beamed pulse, and means associated with said beam projection device for providing simulated range when said interception occurs.

7. The combination as set forth in claim 6 wherein said means for automatically varying the frequency of said oscillator comprises a variable air condenser the rotor of which is coupled with said beam projection device.

8. In a trainer device for simulating operation of an echo ranging target detection system wherein a beam of modulated light is swept outwardly from a simulated zero range position, means for producing said beam comprising, a source of light, a mask containing a slit for passing said light, a shutter cooperative with said slit, means for driving said shutter at a selected frequency to thereby modulate said light at said frequency, a second mask having a V shaped slot, said second mask being cooperative with said slit, and means for moving said second mask relative to said slit to vary the light-passing area thereof.

9. In a trainer device for simulating operation of an echo ranging target detection system wherein a beam of modulated light is swept outwardly from a simulated zero range position, means for producing said beam comprising, a source of light, a mask containing a slit for passing said light, a shutter cooperative with said slit, means for driving said shutter at a selected frequency to thereby modulate said light at said frequency, a second mask having a V shaped slot, said slot being covered with a material having a graded transparency characteristic, said second mask being cooperative with said slit, and means for moving said second mask relative to said slit to vary the light-passing area thereof and to vary the intensity of the light so passed.

10. The combination in claim 9 and further including mirror means movable with said second mask for sweeping the modulated light beam produced.

11. In a trainer device for simulating operation of an echo-ranging target detection system, means for producing a modulated light beam having a steadily increasing width and a steadily decreasing intensity, control means for sweeping said beam outwardly from a simulated zero range position at any selected bearing, means for controlling the bearing of said beam, means for varying the rate of light modulation as a function of light beam bearing, means producing a simulated reverberation signal as said beam leaves the zero range position, said reverberation signal having changing frequency and steadily decreasing intensity characteristics, a simulated range indicator, means for actuating said indicator simultaneously with operation of said beam sweeping means, a bearing indicator operated by said bearing control means, a mobile light-sensitive pick-up unit simulating a target in motion, and signal means simulating an echo signal actuated by said pick-up unit as the latter intercepts said sweeping light beam.

12. In a trainer device for simulating operation of an echo-ranging target detection system; a scanner unit comprising a source of light, a mask containing a rectangular slit for passing said light, a shutter cooperative with said slit, means for driving said shutter at a selected frequency to modulate said light at said frequency, a second mask having a V shaped slot, said slot being covered with a material having a graded transparency characteristic, said second mask being cooperative with said slit, means for moving said second mask to vary the light-passing area of said slit and to vary the intensity of the light passed thereby, and mirror means movable with said second mask for sweeping said light outwardly from a simulated zero range position; control means for rotating said scanner unit whereby said modulated light may be swept outwardly at any selected bearing; a bearing indicator actuated by said control means; means actuated by said control means for varying the rate of light modulation as a function of scanner unit bearing; means producing a simulated reverberation signal as said light leaves the simulated zero range position, said reverberation signal having a changing frequency and steadily decreasing intensity characteristics; a simulated range indicator, means for actuating said indicator simultaneously with operation of said second mask and mirror moving means; a mobile light-sensitive pick-up unit simulating a target in motion; and signal means simulating an echo signal actuated by said pick-up unit as the latter intercepts said sweeping light.

EARL W. SPRINGER.

REFERENCES CITED

The following references are of record in the file of this patent:

UNITED STATES PATENTS

| Number | Name | Date |
| --- | --- | --- |
| 360,844 | Maurer | Apr. 27, 1943 |
| 1,834,405 | Kosken | Dec. 1, 1931 |
| 1,848,882 | Hausroth | Mar. 8, 1932 |
| 1,907,105 | Haworth | May 2, 1933 |
| 2,007,220 | Smith | July 9, 1935 |
| 2,287,429 | Hooker et al. | June 23, 1942 |
| 2,312,962 | DeFlorez | Mar. 2, 1943 |
| 2,326,766 | Delareulle | Aug. 17, 1943 |
| 2,326,880 | Norrman | Aug. 17, 1943 |
| 2,369,622 | Toulon | Feb. 13, 1945 |
| 2,405,591 | Mason | Aug. 13, 1946 |

OTHER REFERENCES

Posthumous Papers of the Pickwick Club, Dickens; A. L. Burt Co., Richmond Public Library, D. 548, chapter XXXVIII, pages 564, 565, 567 and 568.